United States Patent [19]
Suzuki et al.

[11] Patent Number: 4,613,455
[45] Date of Patent: Sep. 23, 1986

[54] CERAMIC HEATER AND A METHOD FOR ITS PRODUCTION

[75] Inventors: Hirofumi Suzuki, Kariya; Hitoshi Yoshida; Shunzo Yamaguchi, both of Okazaki, all of Japan

[73] Assignee: Nippondenso Co., Ltd., Kariya, Japan

[21] Appl. No.: 811,317

[22] Filed: Dec. 19, 1985

[30] Foreign Application Priority Data

Sep. 8, 1983 [JP] Japan ............................ 58-165692

[51] Int. Cl.⁴ .......................... C04B 35/58; H05B 3/10
[52] U.S. Cl. .................................... 252/516; 219/553; 252/520; 264/61; 501/87; 501/97; 501/98
[58] Field of Search ...................... 252/516, 518, 520; 501/97, 98, 87; 219/553, 270; 264/61

[56] References Cited

U.S. PATENT DOCUMENTS

| | | | |
|---|---|---|---|
| 3,895,219 | 7/1975 | Richerson et al. | 219/553 |
| 4,252,768 | 2/1981 | Perkins et al. | 501/97 X |
| 4,376,652 | 3/1983 | Buljan | 501/97 |
| 4,449,039 | 5/1984 | Fukazawa et al. | 252/520 X |
| 4,475,029 | 10/1984 | Yoshida et al. | 252/520 X |
| 4,486,651 | 12/1984 | Atsumi et al. | 252/518 X |
| 4,499,366 | 2/1985 | Yoshida et al. | 252/518 X |
| 4,555,358 | 11/1985 | Matsushita et al. | 252/516 |

FOREIGN PATENT DOCUMENTS 59-83986  5/1984  Japan ............................ 264/61

Primary Examiner—Helen M. McCarthy
Attorney, Agent, or Firm—Cushman, Darby & Cushman

[57] ABSTRACT

A ceramic heater of the present invention comprises a sintered heating element bonded to a supporting substrate or a sintered element alone. A sintered body comprises the heating element is mainly composed of silicon nitride with such sintering agents as yttrium oxide to be superior in strength, thermal shock resistance and thermal resistance. The sintered body also includes 10–80 mol % of titanium carbide, titanium nitride or a mixture thereof which are electrically conductive ceramics so that the specific electrical resistance can be controlled.

A method for producing a ceramic heater of the present invention consists of the first process in which a powdery mixture is prepared by mixing powders which are made to have structures of a solid solution by previous calcination of silicon nitride and a sintering agent and powders of conductive ceramics which comprise either or both of titanium carbide and titanium nitride, and the second process in which such powdery mixture is formed and sintered by heating.

5 Claims, 3 Drawing Figures

CERAMIC HEATER AND A METHOD FOR ITS PRODUCTION

This is a continuation of application Ser. No. 640,985, filed Aug. 15, 1984, now abandoned.

BACKGROUND OF THE INVENTION

1. Field of the Invention

The present invention relates to a ceramic heater and more particularly to a ceramic heater mainly composed of silicon nitride and a method for producing it.

2. Description of the Prior Art

Conventionally, some metals and ceramics have been used as heating elements. Such metallic elements are nichromes and kanthals have such low thermal resistances that they readily deteriorate above 1,000° C. Meanwhile, such ceramic elements as silicon carbide, molybdenum silicide and lanthanum chromite have low thermal shock resistances and strengths. In addition, it is difficult to use ceramic heating elements at a low voltage, for example, at 12 v of automotive batteries, because of their high specific electrical resistances.

SUMMARY OF THE INVENTION

The object of the present invention is to solve the above-mentioned problems of the prior art. In other words, an object of this invention is to provide a ceramic heater, which has superior strength, thermal shock resistance and thermal resistance and a method for producing such a heater.

Another object of the invention is to provide a ceramic heater with a controllable specific electrical resistance, which therefore can be used at a low voltage, and a method for producing such ceramic heater.

BRIEF DESCRIPTION OF THE DRAWINGS

FIG. 1 shows crystalline particles of silicon nitride 1 and mixed particles of titanium carbide and titanium nitride 2.

DETAILED DESCRIPTION OF THE PRESENT INVENTION

Figure 1:
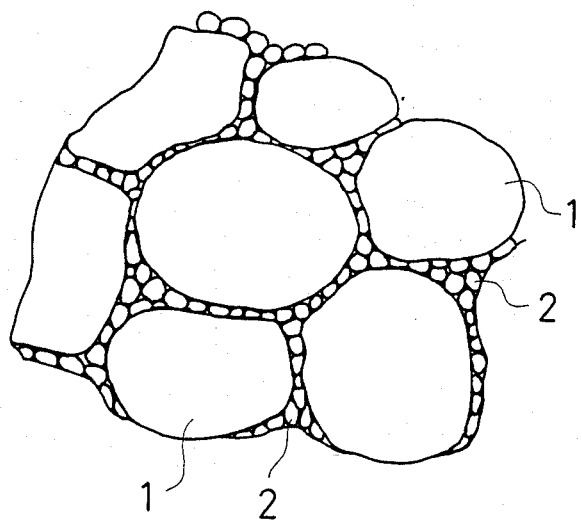
FIG. 1 is a microscopic representation of a section showing a typical structure of a sintered body used for the ceramic heater of the present invention.

The inventors of the present invention found that the specific electrical resistance of a sintered heating element can be suitably controlled by use of a powdery mixture, comprising silicon nitride ($SI_3N_4$) which is electrically non-conductive ceramic and titanium carbide (TiC) or titanium nitride (TiN) which is an electrically conductive ceramic, for making the sintered body.

The inventors completed the present invention on the basis of the above-mentioned findings. The ceramic heater of the present invention is characterized by a heating element, which is an electrically conductive sintered body, mainly comprising silicon nitride and at least one of two conductive substances of titanium carbide and titanium nitride. Also, the invention is characterized in that the conductive ceramics are present in 10–80 mol %, for 100 mol % of the entire sintered body. The ceramic heater of the present invention may be a heater composed of a sintered heating element bonded to a supporting substrate as well as a heater composed of a sintered element alone. The sintered body which characterizes the ceramic heater of the present invention is mainly composed of silicon nitride and either or both of titanium carbide and titanium nitride.

Silicon nitride is a ceramic that is superior in strength, thermal shock resistance and thermal resistance. Titanium carbide and titanium nitride have superior mechanical strengths at high temperatures, and excellent thermal resistances as easily understood by their use as main ingredients of cermets used for heat resistant parts and cutting tools, such as throwaway tips. The specific electrical resistance of titanium nitride is $1 \times 10^{-5}$ ohm cm at room temperature and that of titanium carbide is $7 \times 10^{-5}$ ohm cm at room temperature and $1 \times 10^{-4}$ ohm cm at 1000° C.

Because titanium carbide and titanium nitride are oxidizable, sintered bodies are likely to be oxidized when they include a large amount of titanium carbide or titanium nitride. On the contrary, when the content of titanium carbide or titanium nitride used as a conductive ceramic is insufficient, the specific resistance of the sintered body used as a heater exceeds the level of $10^3$ ohm cm and, consequently, the body is unsuitable as a ceramic heater.

Therefore, the content of titanium carbide or titanium nitride or a mixture thereof is required to range from 10 to 80 mol %. When the content of titanium carbide and/or titanium nitride is controlled within that range, the specific resistance of the sintered body as a heater can be controlled appropriately.

It is desirable that the sintered body includes such sintering agents as yttrium oxide. Addition of yttrium oxide to silicon nitride increases the density of a sintered body and therefore produces a compact sintered body. The densification of the sintered body is effective to prevent oxidation of titanium carbide and titanium nitride, and therefore, further improves the thermal resistance of the sintered body used as a heater. Magnesium oxide (MgO), alumina ($Al_2O_3$) silicon dioxide ($SiO_2$) and magnesium alumina ($MgAl_2O_4$) are also sintering agents to densify the sintered bodies. The content of such sintering agents as yttrium oxide and magnesium oxide is preferred to range from 3.5 to 15.0 mol % for 100 mol % of the entire sintered body.

The figure shows a typical structure of a sintered body which characterizes the ceramic heater of the present invention. In the figure, the diameter of silicon nitride particles 1 is preferred to range between $10\mu$ and $50\mu$. Silicon nitride particles 1 contain yttrium oxide within them. In the boundaries of silicon nitride particles 1, there are fine particles 2 of a mixture of titanium carbide and titanium nitride which form a continuous boundary layer between silicon nitride particles. The diameter of the particles 2 is preferred to range between $0.1\mu$ and $4\mu$. With such a range of diameters, a heater having a low resistance can be obtained.

A method for producing the ceramic heater of the present invention consists of two processes. In the first process, silicon nitride powders and sintering agents are calcined into solid solution powders. Such powders are mixed with powders of a conductive ceramic comprising at least one of titanium carbide and titanium nitride. In the second process, the mixed powders are formed and sintered to produce a sintered body.

Preferably, the silicon nitride powders are of large solid solution particles, which are made by previously calcining silicon nitride and such sintering agents as yttrium oxide. The calcination is preferably made at 1300° C. for an hour.

The diameter of silicon nitride powders, which are agglomerates of primary particles with diameters less than $2\mu$, is larger than that of the above-mentioned conductive ceramic powders.

Use of the above-mentioned powders composing of agglomerates of the primary particles made by preliminary calcination, unlike the case without calcination, remarkably reduces the specific resistance of the sintered body without lowering the strength and the relative density of the sintered body. The reason is believed to be that the silicon nitride particles are larger than the conductive ceramic particles. The powders of silicon nitride and the conductive ceramics may be blended in a wet process. Forming and sintering may be made in a conventional process.

A typical method for producing such sintered bodies by use of sintering agents will be described in the following (A) to (I).

(A) Silicon nitride powders and sintering agents are weighed in the required amounts.

(B) The weighed silicon nitride powders and sintering agents are wet blended by use of water for 12 hours.

(C) The blended powders are dried at 120° C.

(D) The mixed powders are granulated into grains with a size of $40\mu$ by a spraying method with continuous addition of a small quantity of polyvinyl butyral binder.

(E) The granulated powders are calcined to have a structure of a solid solution. The calcination was carried out in a nitrogen atmosphere at 1300° C. for an hour.

(F) Titanium carbide, titanium nitride or a mixture thereof are wet blended with the powders which have been calcined in (E) by use of water for 5 hours.

(G) The wet blended powders are dried at 120° C. The dried powder may be granulated again, or blended with a binder solution to form a slurry or a paste.

(H) The regranulated powders, the slurry or the paste is formed into a certain form. For example, in order to produce a bar-shaped ceramic heater, the granulated powders are pressed in a mold to make a compacted body. In order to produce a thin plate ceramic heater, a paste is made thin with a doctor blade to give a thin plate, which is then punched to give a thin green compact with a desired shape. In order to produce a printed heater, the paste is screen-printed on an alumina substrate.

(I) To produce a sintered body, the formed powders are sintered in the range of 1650°–1850° C., more preferably 1750°–1800° C. The sintering is carried out in a non-oxidative, inert or nitrogen atmosphere to prevent oxidation of the silicon nitride, titanium nitride and titanium carbide.

The present invention provides a ceramic heater which has a suitable specific electrical resistance for a heater. Because the main element of the ceramic heater is silicon nitride, the ceramic heater provides superior strength, thermal shock resistance and thermal resistance. The present invention can control the specific resistance of a ceramic heater, for example, in a range of $10^{-3}$–$10^3$ ohm cm and provide a ceramic heater which can be used even at a low voltage. In this invention, the use of such sintering agents as yttrium oxide can increase the density of the sintered body above 90%, reduce the specific resistance down to $10^{-4}$ ohm cm and increase the strength.

Next, the effects of the present invention will be explained by way of experimental examples.

EXPERIMENT 1

Powders of silicon nitride of $0.8\mu$ in average particle diameter, titanium nitride of $0.5\mu$, titanium carbide of $0.5\mu$ were weighed as required to prepare a set of mixed powders with the compositions shown in Nos. 1–14 of Table 1. The mixed powders contain no sintering agents, such as yttrium oxide.

The mixed powders with the composition in each of Nos. 1–14 of Table 1 were put in water and well blended for 12 hours. After drying, the wet blended powders were granulated. Then the powders were pressed in a mold of $5\times4\times55$ mm in size, and the preform was sintered in nitrogen atmosphere at 1750° C. for 4 hours to produce a sintered body. Measurements were made of the relative densities, specific resistances and strengths of those sintered bodies.

Table 1 shows the results of Experiment 1. As Table 1 shows, the relative densities were in a range of 55–74%. Most of the specific resistances were in a range of $10^1$–$10^3$ ohm cm. The strengths were in a range of 18–27 kg/mm².

EXPERIMENT 2

The mixed powders were prepared for the compositions in Nos. 1–13 shown of Table 2. The mixed powders contained yttrium oxide as a sintering agent.

The mixed powders with each of the compositions in Nos. 1–13 were wet blended, dried, pressed and sintered to produce a sintered body. Then, the relative densities, specific resistances and strengths of those sintered bodies were measured. The conditions of wet-blending, drying, forming and sintering, and the measurement conditions of the relative density, specific resistance and strength were

TABLE 1

| Experimental Condition | | | | Experimental Results | | |
|---|---|---|---|---|---|---|
| | Composition (mol %) | | | Relative Density | Specific Resistance | Strength |
| No. | Si$_3$N$_4$ | TiN | TiC | (%) | (ohm · cm) | (kg/mm²) |
| 1 | 90 | 10 | | 73.6 | $5.1 \times 10^5$ | 25.6 |
| 2 | 80 | 20 | | 72.4 | $1.8 \times 10^3$ | 26.3 |
| 3 | 70 | 30 | | 71.8 | $6.2 \times 10^1$ | 24.4 |
| 4 | 60 | 40 | | 70.9 | $4.6 \times 10^0$ | 24.5 |
| 5 | 40 | 60 | | 67.5 | $6.8 \times 10^{-1}$ | 22.2 |
| 6 | 20 | 80 | | 62.1 | $2.3 \times 10^{-2}$ | 18.7 |
| 7 | 90 | | 10 | 70.2 | $6.9 \times 10^6$ | 23.6 |
| 8 | 80 | | 20 | 70.8 | $2.3 \times 10^4$ | 21.9 |
| 9 | 70 | | 30 | 68.9 | $5.1 \times 10^2$ | 20.0 |
| 10 | 60 | | 40 | 66.2 | $3.8 \times 10^1$ | 18.0 |
| 11 | 90 | 5 | 5 | 74.1 | $4.3 \times 10^4$ | 27.6 |
| 12 | 80 | 10 | 10 | 73.2 | $9.6 \times 10^2$ | 25.4 |
| 13 | 70 | 15 | 15 | 70.8 | $2.3 \times 10^1$ | 25.1 |
| 14 | 60 | 20 | 20 | 68.3 | $1.0 \times 10^0$ | 23.2 |

TABLE 2

| Experimental Condition | | | | Experimental Results | | |
|---|---|---|---|---|---|---|
| | Composition (mol %) | | | Relative Density | Specific Resistance | Strength |
| No. | Si$_3$N$_4$ | Y$_2$O$_3$ | TiN | (%) | (ohm · cm) | (kg/mm²) |
| 1 | 68.25 | 1.75 | 30 | 86.2 | $4.2 \times 10^{-1}$ | 35.5 |
| 2 | 66.6 | 3.5 | 30 | 92.8 | $4.6 \times 10^{-2}$ | 52.1 |

TABLE 2-continued

| | Experimental Condition | | | Experimental Results | | |
|---|---|---|---|---|---|---|
| | Composition (mol %) | | | Relative Density | Specific Resistance | Strength |
| No. | Si₃N₄ | Y₂O₃ | TiN | (%) | (ohm · cm) | (kg/mm²) |
| 3 | 64.75 | 5.25 | 30 | 94.3 | $2.9 \times 10^{-2}$ | 55.2 |
| 4 | 63 | 7 | 30 | 95.0 | $3.2 \times 10^{-2}$ | 58.8 |
| 5 | 59.5 | 10.5 | 30 | 93.6 | $4.5 \times 10^{-2}$ | 58.9 |
| 6 | 56 | 14 | 30 | 88.7 | $3.0 \times 10^{-1}$ | 43.4 |
| 7 | 52.5 | 17.5 | 30 | 84.1 | $6.8 \times 10^{-1}$ | 34.7 |
| 8 | 81 | 9 | 10 | 94.5 | $3.1 \times 10^{3}$ | 56.2 |
| 9 | 72 | 8 | 20 | 95.1 | $1.0 \times 10^{-1}$ | 57.7 |
| 10 | 54 | 6 | 40 | 93.9 | $5.5 \times 10^{-3}$ | 51.8 |
| 11 | 45 | 5 | 50 | 92.2 | $1.1 \times 10^{-3}$ | 46.2 |
| 12 | 36 | 4 | 60 | 90.5 | $8.3 \times 10^{-4}$ | 38.1 |
| 13 | 18 | 2 | 80 | 80.6 | $2.7 \times 10^{-3}$ | 31.1 | the same as those in Experiment 1.

Table 2 shows the experimental results of the relative density, specific resistance and strength. As Table 2 shows, the sintered bodies including yttrium oxide had considerably increased relative density and compactness. The densification of the sintered bodies effectively prevented oxidization of titanium carbide and titanium nitride and improved the thermal resistance of the sintered bodies. And, the increase of the relative density was accompanied with the increase of the strength. Moreover, the densification was effective to lower the specific resistance by three orders.

Firstly, in comparison of the relative density of No. 3 in Table 1 with those of Nos. 1–7 in Table 2 which equally contained 30% of titanium nitride, No. 3 in Table 1 which contained no yttrium oxide had a relative density of 71.8%, while all of Nos. 1–7 in Table 2 which contain yttrium oxide had densities more than 84%. Particularly, most of Nos. 2–6 which contained yttrium oxide in a range of 3.5–15 mol % marked higher densities than 90%, which was higher by 25% or more in comparison with that of No. 3 in Table 1. Especially, No. 4 which contained 7% of yttrium oxide marked the highest density of 95%.

Secondly, in comparison of the strengths between Nos. 3 in Table 1 and Nos. 1–7 in Table 2, which all contained the same 30% of titanium nitride, the strength of No. 3 in Table 1 which contained no yttrium oxide was 24.4 kg/mm², while all the strengths of Nos. 1–7 in Table 2 were higher than 34 kg/mm². Especially, most of Nos. 2–6 in Table 2 which contained yttrium oxide in a range of 3.5–15% had higher strength than 43 kg/mm², which was remarkably increased by more than 76% in comparison with No. 3 in Table 1.

Thirdly, in comparison of specific electrical resistances between No. 3 in Table 1 and Nos. 1–7 in Table 2, No. 3 in Table 1 which contained no yttrium oxide had a specific resistance of $6.2 \times 10'$ ohm cm, while Nos. 1–7 in Table 2 had specific resistances in a range of $10^{-1}$–$10^{-2}$ ohm cm, which were smaller than that of No. 3 in Table 1 by two or three orders. Particularly, Nos. 2–5 in Table 2 which contained 3.5–15% of yttrium oxide had specific resistances of $10^{-2}$ ohm cm or so.

EXPERIMENT 3

Table 3 shows the relative densities, specific resistances and strengths of sintered bodies in which titanium carbide was added to silicon nitride, and a mixture of titanium carbide and titanium nitride was added to silicon nitride. In comparison of the relative densities between No. 9 in Table 1 and Nos. 1–12 in Table 3, which all included the same amount of 30% for a mixture of titanium carbide and titanium nitride, No. 9 in Table 1 with no yttrium oxide had a relative density

TABLE 3

| | Experimental Condition | | | | Experimental Results | | |
|---|---|---|---|---|---|---|---|
| | Composition (mol %) | | | | Relative Density | Specific Resistance | Strength |
| No. | Si₃N₄ | Y₂O₃ | TiC | TiN | (%) | (ohm · cm) | (kg/mm²) |
| 1 | 68.25 | 1.75 | 30 | | 85.0 | $6.9 \times 10^{-1}$ | 34.3 |
| 2 | 66.5 | 3.5 | 30 | | 91.7 | $8.5 \times 10^{-2}$ | 49.8 |
| 3 | 64.75 | 5.25 | 30 | | 93.4 | $4.0 \times 10^{-2}$ | 52.1 |
| 4 | 63 | 7 | 30 | | 92.6 | $3.8 \times 10^{-2}$ | 52.6 |
| 5 | 59.5 | 10.5 | 30 | | 92.8 | $5.8 \times 10^{-2}$ | 53.6 |
| 6 | 56 | 14 | 30 | | 87.5 | $3.3 \times 10^{-1}$ | 41.6 |
| 7 | 52.5 | 17.5 | 30 | | 82.1 | $9.0 \times 10^{-1}$ | 32.0 |
| 8 | 63 | 7 | 25 | 5 | 93.2 | $3.7 \times 10^{-2}$ | 52.4 |
| 9 | 63 | 7 | 20 | 10 | 93.0 | $3.6 \times 10^{-2}$ | 53.5 |
| 10 | 63 | 7 | 15 | 15 | 94.0 | $3.6 \times 10^{-2}$ | 54.3 |
| 11 | 63 | 7 | 10 | 20 | 94.5 | $3.5 \times 10^{-2}$ | 65.1 |
| 12 | 63 | 7 | 5 | 25 | 94.8 | $3.4 \times 10^{-2}$ | 57.6 | of 68.9%, while all of Nos. 1–12 in Table 3 with yttrium oxide had relative densities higher than 82% which means improved compactness. Above all, all of Nos. 2–6 in Table 3 which included yttrium oxide in a range of 3.5–15% had densities higher than 87%, and Nos. 8–12 had densities higher than 87%.

In other words, the relative densities of Nos. 2–6 and Nos. 8–12 were higher by 26% increase in comparison with that of No. 9 in Table 1.

Strength comparison will be made between No. 9 in Table 1 and Nos. 1–12 in Table 3. These samples contained titanium carbide or mixture of titanium carbide and titanium nitride at the same content of 30%. No. 9 in Table 1 with no yttrium oxide had a strength of 20.0 kg/mm², while Nos. 1–12 in Table 3 with yttrium oxide had strengths higher than 34 kg/mm². Especially, Nos. 2–6 and Nos. 8–12 in Table 3 which included yttrium oxide in a range of 3.5–15%, had strengths higher than 41.6 kg/mm². This indicates a remarkable increase of more than 200%, as compared with No. 9 in Table 1.

In comparison of specific electrical resistances between No. 9 in Table 1 and Nos. 1–7 in Table 3, which included titanium carbide in the same amount of 30%, No. 9 in Table 1 with no yttrium oxide had a specific resistance of $5.1 \times 10^2$ ohm cm, while Nos. 1–7 in Table 3 with yttrium oxide had specific resistances of $10^{-1}$–$10^{-2}$ ohm cm.

EXPERIMENT 4

Table 4 shows the experimental results when silicon nitride and sintering agents were previously calcined. A powdery mixture mainly composed of silicon nitride and yttrium oxide was granulated and calcined. The silicon nitride powders, thus prepared, were mixed with titanium nitride powders, formed in a certain shape and then sintered to produce a sintered body. The calcination was made at 1300° C. in a nitrogen atmosphere for an hour. Other experimental conditions were the same as those of Tables 1 and 2.

Comparison will be made between No. 1 in Table 4 and No. 2 in Table 2, which had the same composition. The relative densities and the strengths were almost the same in either previously calcined or uncalcined No. 2 in Table 4. However, calcined No. 1 in Table 4 had a specific resistance of $1.1 \times 10^{-2}$ ohm cm, while uncalcined No. 2 in Table 2 has a specific resistance of $4.6\times10^{-2}$ ohm cm. Namely, the resistance of the former is about one-fourth of that of the latter. In comparison between No. 2 in Table 4 and No. 3 in Table 2, No. 3 in Table 4 and No. 4 in Table 2, No. 4 in Table 4 and No. 5 in Table 2, No. 5 in Table 4 and No. 8 in Table 2, No. 6 in Table 4 and No. 9 in Table 2, No. 8 in Table 4 and No. 11 in Table 2, No. 9 in Table 4 and No. 12 in Table 2, which had the same composition for each pair, the relative

TABLE 4

| | Experimental Condition | | | Experimental Results | | |
|---|---|---|---|---|---|---|
| | Composition (mol %) | | | Relative Density | Specific Resistance | Strength |
| No. | Si$_3$N$_4$ | Y$_2$O$_3$ | TiN | (%) | (ohm · cm) | (kg/mm$^2$) |
| 1 | 66.5 | 3.5 | 30 | 93.0 | $1.1 \times 10^{-2}$ | 51.8 |
| 2 | 64.75 | 5.25 | 30 | 94.1 | $9.6 \times 10^{-3}$ | 54.6 |
| 3 | 63 | 7 | 30 | 94.8 | $1.0 \times 10^{-2}$ | 57.3 |
| 4 | 59.5 | 10.5 | 30 | 94.2 | $1.1 \times 10^{-2}$ | 57.9 |
| 5 | 81 | 9 | 10 | 94.3 | $9.3 \times 10^{2}$ | 58.2 |
| 6 | 72 | 8 | 20 | 94.6 | $2.8 \times 10^{-1}$ | 57.5 |
| 7 | 56 | 6 | 40 | 93.5 | $1.6 \times 10^{-3}$ | 52.0 |
| 8 | 45 | 5 | 50 | 91.8 | $5.3 \times 10^{-4}$ | 48.1 |
| 9 | 36 | 4 | 60 | 90.5 | $3.8 \times 10^{-4}$ | 39.1 | densities and the strengths were also almost the same. However, the specific resistances of samples in Table 4, previously calcined, one-fourth to one-third of those of uncalcined samples in Table 2.

Accordingly, increase of the size of silicon nitride powders by previous granulation lowers the specific resistance to one-fourth to one-third without any reduction in the relative density and strength. Therefore, the ceramic heater made from these ceramics can be used at a low voltage (12 V) supplied from a car battery.

EXPERIMENT 5

Table 5 shows the thermal expansion coefficients and the rates of weight change by oxidation for various sintered bodies. The thermal expansion coefficients indicate the average values from room temperature up to 1000° C. The rates of weight change by oxidation were measured for sintered bodies which were exposed to air at 1000° C. for 400 hours. The sintered body including 80% of titanium nitride, as shown in No. 8 in Table 5, has a thermal expansion coefficient of $7.3 \times 10^{-6}$° C.$^{-1}$. The rate of weight change by oxidation was 12.56%. The value was 10–100 times larger than those of Nos. 1–7 in Table 5. Similarly, No. 14 in Table 5 including 80% of titanium nitride and titanium carbide had a coefficient of $7.2 \times 10^{-6}$° C.$^{-1}$ in a rate of weight change by oxidation of 10.21%. Therefore, the inventors

TABLE 5

| | Experimental Condition | | | | Experimental Results | |
|---|---|---|---|---|---|---|
| | Composition (mol %) | | | | Thermal Expansion Coefficient | Rate of Weight Change by Oxidation |
| No. | Si$_3$N$_4$ | Y$_2$O$_3$ | TiN | TiC | (°C$^{-1}$) | (%) |
| 1 | 81 | 9 | 10 | | $3.0 \times 10^{-6}$ | 0.18 |
| 2 | 72 | 8 | 20 | | $3.6 \times 10^{-6}$ | 0.18 |
| 3 | 63 | 7 | 30 | | $4.2 \times 10^{-6}$ | 0.20 |
| 4 | 54 | 6 | 40 | | $4.8 \times 10^{-6}$ | 0.40 |
| 5 | 45 | 5 | 50 | | $5.5 \times 10^{-6}$ | 0.64 |
| 6 | 36 | 4 | 60 | | $6.0 \times 10^{-6}$ | 0.91 |
| 7 | 27 | 3 | 70 | | $6.7 \times 10^{-6}$ | 1.50 |
| 8 | 18 | 2 | 80 | | $7.3 \times 10^{-6}$ | 12.56 |
| 9 | 36 | 4 | | 60 | $6.0 \times 10^{-6}$ | 0.95 |
| 10 | 27 | 3 | | 70 | $6.7 \times 10^{-6}$ | 1.87 |
| 11 | 18 | 2 | | 80 | $7.4 \times 10^{-6}$ | 15.35 |
| 12 | 36 | 4 | 30 | 30 | $5.9 \times 10^{-6}$ | 0.88 |
| 13 | 27 | 3 | 35 | 35 | $6.5 \times 10^{-6}$ | 1.11 |
| 14 | 18 | 2 | 40 | 40 | $7.2 \times 10^{-6}$ | 10.21 | found that when the content of titanium nitride and/or titanium carbide exceeds 80%, the coefficient of thermal expansion becomes large, and a sintered body with such composition is remarkably oxidizable to be inappropriate for a heating element.

EXPERIMENT 6

Figure 2:
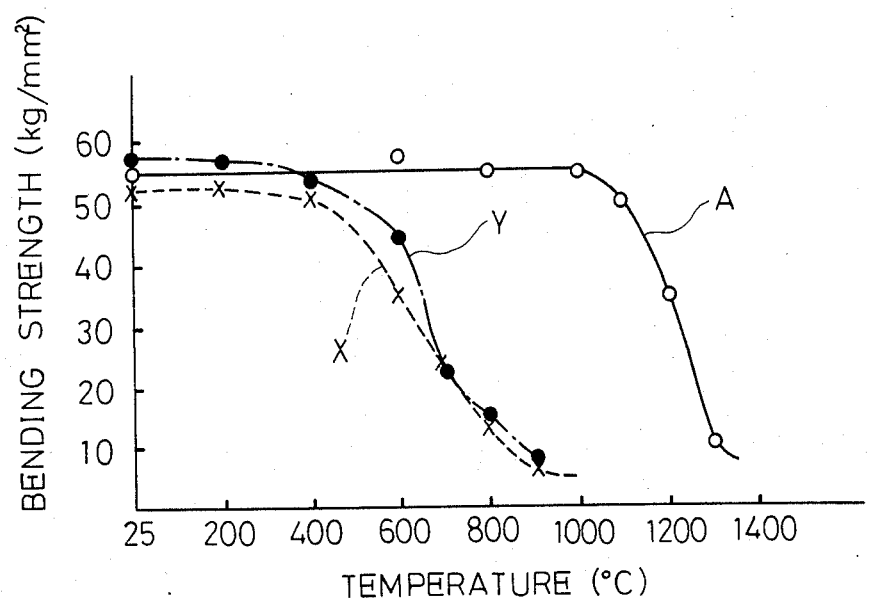
FIG. 2 is a graph showing a relationship between the bending strength of the heating elements and temperature according to Experiment 6.

The following experiment was carried out in order to demonstrate that the materials of the heater of the present invention have large strengths at high temperatures. Heating element of the present invention A (63Si$_3$N$_4$−7Y$_2$O$_3$−30TiN) in FIGS. 2 and 3 had the same composition as No. 4 in Table 2. And alumina heating elements X (66.5Al$_2$O$_3$−30TiC−1MgO−2.5Ni) and Y (68Al$_2$O$_3$−30TiN−1MgO−1Ni) in FIGS. 2 and 3 were the same as shown in Table 4 of U.S. Pat. No. 4,449,039. The above-mentioned three heating elements were respectively formed into the bar of $3\times3\times50$ mm in size and then subjected to 3 point bending tests at room temperature (25° C.) and temperatures of 200°–1,300° C. FIG. 2 shows the results of this experiment.

EXPERIMENT 7

Figure 3:
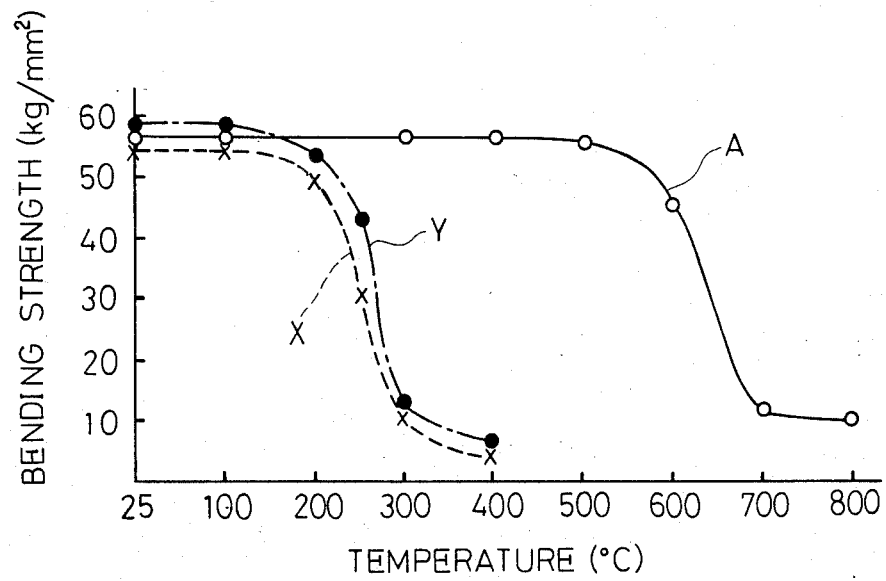
FIG. 3 is a graph showing a relationship between the bending strength and the temperature of the specimens subjected to thermal shocks according to Experiment 7.

This experiment was carried out to demonstrate that the materials of the heater of the present invention are remarkably resistant to thermal shocks. The same specimens as used in Experiment 6 were heated up to certain temperatures in a range of 100°–800° C., and then the heated specimens were dropped into water, in order to invoke rapid cooling. After giving such thermal shocks to the specimens, the cooled specimens were subjected to 3 point bending tests at room temperature. FIG. 3 shows the results.

Curves X and Y show a marked decrease of their strength at 250°–300° C., while the heater of this invention A shows a marked decrease of strength at 600°–650° C. Therefore, the present heater can be said to be made of one of the ceramics which have the highest thermal shock resistance.

What is claimed is:

1. A ceramic heater having a heating element composed of a sintered body of powdery mixture consisting essentially of:
    from 20 to 90 mol % of silicon nitride powder including a sintering agent selected from the group consisting of yttrium oxide, magnesium oxide, aluminum oxide, silicon dioxide, aluminium magnesium oxide (MgAl$_2$O$_4$) and a mixture thereof, and
    from 10 to 80 mol % of an electrically conductive ceramic powder selected from the group consisting of titanium carbide, titanium nitride and a mixture thereof and having a particle diameter smaller than said silicon nitride powder including said sintering agent, this electrically conductive ceramic powder existing at grain boundaries of the silicon nitride of said sintered body; and said heater having a resistance controllable within a range of $10^{-3}$ to $10^3$ ohm cm.

2. A ceramic heater according to claim 1, wherein said silicon nitride powder including said sintering agent has a particle diameter of from 10 to 50 microns, and said electrically conductive powder has a particle diameter of from 0.1 to 4 microns.

3. A ceramic heater according to claim 1, wherein said sintering agent constitutes from 3.5 to 15 mol % per 100 mol % of the entire sintered body.

4. A method of producing a ceramic heater having a heating element composed of a sintered body, said method comprising the steps of:
  (a) preparing a mixture consisting essentially of
    (1) from 20 to 90 mol % of silicon nitride powders which are prepared by mixing silicon nitride and a sintering agent selected from the group consisting of yttrium oxide, magnesium oxide, aluminium oxide, silicon dioxide, aluminium magnesium oxide ($MgAl_2O_4$ and a mixture thereof and calcining into a solid solution, and
    (2) from 10 to 80 mol % of an electrically conductive ceramic powder selected from the group consisting of titanium carbide, titanium nitride and a mixture thereof and having a particle diameter smaller than that of said silicon nitride powder in the solid solution,
  (b) forming the mixture of step (a) into the shape of the desired sintered body; and
  (c) heating and sintering the shape of step (b) in a non-oxidizing inert or nitrogen atmosphere to produce a sintered body in which the electrically conductive powder exists at the grain boundaries of the silicon nitride, said sintered body having a resistance controllable within a range of $10^{-3}$ to $10^3$ ohm cm.

5. A method of producing a ceramic heater according to claim 4, wherein said silicon nitride powder before being calcined into the solid solution in the step (a) has a particle diameter of less than 2 microns.

* * * * *